United States Patent [19]
Shellard

[11] Patent Number: 5,396,293
[45] Date of Patent: Mar. 7, 1995

[54] FILTER CIRCUIT WITH BANDWIDTH VARIED AS A FUNCTION OF BIT ERROR RATE AND LUMINANCE LEVEL

[75] Inventor: Christopher J. Shellard, S. Glamorgan, Wales

[73] Assignee: Deutsche Thomson-Brandt GmbH, Villingen-Schwenningen, Germany

[21] Appl. No.: 236,304

[22] Filed: May 2, 1994

Related U.S. Application Data

[63] Continuation of Ser. No. 137,380, Oct. 14, 1993, abandoned, which is a continuation of Ser. No. 810,788, Dec. 19, 1991, abandoned.

[30] Foreign Application Priority Data

Dec. 27, 1990 [GB] United Kingdom ................. 9028098

[51] Int. Cl.⁶ .......................... H04N 5/21; H04N 9/77
[52] U.S. Cl. .................... 348/489; 348/618; 348/711
[58] Field of Search ........... 348/489, 618, 711; H04N 5/21, 9/77

[56] References Cited

U.S. PATENT DOCUMENTS

| | | | |
|---|---|---|---|
| 3,534,264 | 10/1970 | Blasbalg et al. | 371/5.5 X |
| 4,420,833 | 12/1983 | Noirel | 358/142 X |
| 4,641,181 | 2/1987 | Mobley II | 358/36 |
| 4,713,689 | 12/1987 | Veillard | 358/142 X |
| 4,760,605 | 6/1988 | David et al. | 358/37 X |
| 5,128,942 | 7/1992 | Kojima | 371/5.5 |

FOREIGN PATENT DOCUMENTS

| | | | |
|---|---|---|---|
| 0106368 | 4/1984 | European Pat. Off. | |
| 0233626 | 8/1987 | European Pat. Off. | H04N 7/04 |
| 3136217 | 9/1985 | Germany | H04N 9/654 |
| 2084426 | 4/1982 | United Kingdom | H04N 9/535 |
| 2126453 | 3/1984 | United Kingdom | |
| 2179820 | 3/1987 | United Kingdom | H04N 5/21 |

Primary Examiner—James J. Groody
Assistant Examiner—Cheryl Cohen
Attorney, Agent, or Firm—Joseph S. Tripoli; Peter M. Emanuel

[57] ABSTRACT

An arrangement for enhancing an image corresponding to a television signal including a digital component includes a variable bandwidth filter and a control unit for controlling the bandwidth of the filter in response to the bit error rate (BER) of the digital component of the television signal. The control unit increases the bandwidth as the BER and therefore the signal quality increases and decreases the bandwidth as the BER and therefore the signal quality decreases. In one embodiment, the control unit is responsive to both the BER and the "darkness" of the image represented by the television signal so as to restrict the bandwidth more for relatively dark areas than for relatively light areas.

11 Claims, 2 Drawing Sheets

FILTER CIRCUIT WITH BANDWIDTH VARIED AS A FUNCTION OF BIT ERROR RATE AND LUMINANCE LEVEL

This is a continuation of application Ser. No. 08/137,380, filed Oct. 14, 1993, abandoned, which is a continuation of application Ser. No. 07/810, filed Dec. 19, 1991, abandoned.

This invention relates to a television receiver having a receiving section, a circuit for processing a received television signal, which contains digital data, whereby the circuit is provided with a selection stage, and a measuring circuit for measuring the signal quality, or a measured variable representative of a signal quality, for example signal-to-noise ratio, field intensity, or bit error rate of the received television signal.

Such a television receiver is generally known and serves for the reproduction of television signals. If the television receiver receives television signals of poor signal quality or a poor signal-to-noise ratio, i.e. with a low signal-to-noise ratio between the wanted television signal and the interference signals, then as a rule, visible disturbance results on the screen. This interference is accidental and in particular manifests itself in the form of small, extremely white points on dark, or black, areas of the television screen or black points in white, or light, areas of the screen. Such disturbances are also referred to as "sparklies" or noise spots.

For the determination of the signal quality, or a measured variable representative of a quality of the received television signal, measuring circuits are available. The available circuits control the amplification of the received television signal in such a way that, for example, with low signal-to-noise ratio, the amplification is increased, whereby with suitable measures the disturbing influences are partly suppressed. However, this leads to an insufficiently improved television picture because the interference is also amplified so that the separation of wanted and interference signal is only marginally improved. The invention avoids the afore-mentioned disadvantages and improves the picture quality in a television receiver using simple means.

The invention is based on the knowledge that limiting the transmission bandwidth of a filter raises the selectivity upon receiving a disturbed television signal, increases the signal-to-noise (S/N) ratio of the signal and therewith, improves the signal quality despite loss in the bandwidth of the television signal.

An improvement in the S/N ratio of the demodulated television signal is achieved by means of the invention-type solution, corresponding to a significant improvement in picture quality. The improvement results from limiting the transmission bandwidth of the selection stages upon receiving a weak wanted television signal, at the expense of the television signal bandwidth of the chrominance and luminance information. However, the invention results in considerable improvement in picture, quality. The total reception and the reproduction of the television signal also exhibits an increased tolerance with respect to time variant impairments.

In order to improve the signal quality, a measuring circuit measures the bit error rate (BER) of the signal containing digital data which is provided with an error detecting code (for example a Hamming code), such as in teletext data, VPS data, digital audio data (MAC video signal). The bit error rate (BER) is a measured variable representative of the signal quality. The BER can be measured, for example, in a known circuit like the DMA 2280 DMAC decoder IC in a television receiver upon receiving a MAC television signal.

The selection stages for the luminance and/or chrominance signals are advantageously constructed as lowpass filters with transmission bands that can be restricted, and can be switched depending on the measured BER. The filters can also be built into the above-mentioned DMA decoder IC and can be switched by means of software commands triggered by the BER measurement.

Through the invention, in particular, with a low S/N ratio in a received television signal, the number of "sparklies" is reduced by using the invention, and therefore, the picture quality is subjectively clearly improved.

Figure 1:
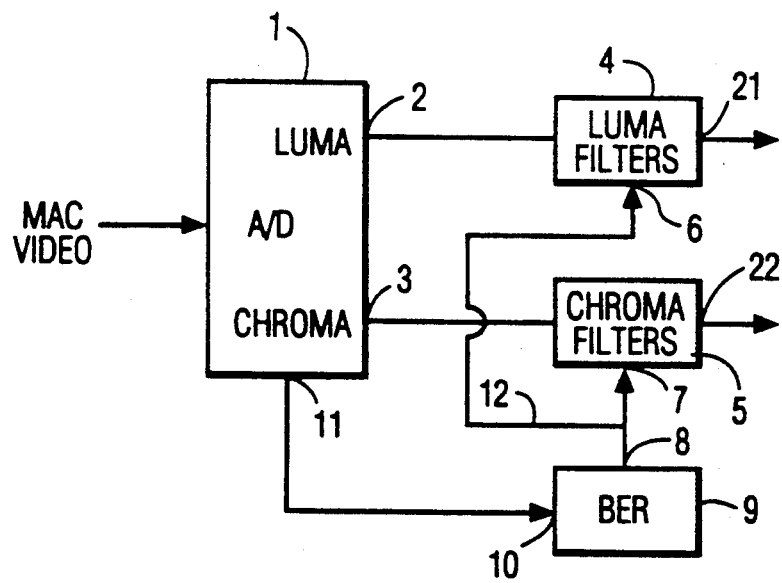
FIG. 1 is a block circuit diagram of a preferred embodiment of a circuit for processing a television signal.

In FIG. 1, an analog-to-digital converter 1 receives a MAC video signal. The MAC video signal contains digital data, like audio, teletext or VPS (video programming system) data, which is provided with an error detecting code, preferably a Hamming code. The analog-to-digital converter apportions the picture components of the MAC video signal into a luminance and a chrominance component and supplies both signal components to the digital filters 4 and 5 as eight bit words via respective output terminals 2 and 3. The digital filters 4 and 5 are digital lowpass filters (or interpolation filters) and respectively have control input terminals 6 and 7. The control input terminal 6 of the luminance filter 4 and the control input terminal 7 of the chrominance filter 5 are connected, by a databus 12, for example an intermettalic (IM) bus, to an output terminal 8 of a bit error rate measuring circuit 9. The measuring circuit 9 is connected, by an input terminal 10, to a third output terminal 11 of the analog-to-digital converter 1, from which the digital data signals, or the so-called data burst, of the MAC video signal is fed to the measuring circuit 9. The luminance and chrominance signals are sent by the output terminals 21 and 22 of the digital lowpass filters 4 and 5 respectively for further signal processing.

Figure 3:
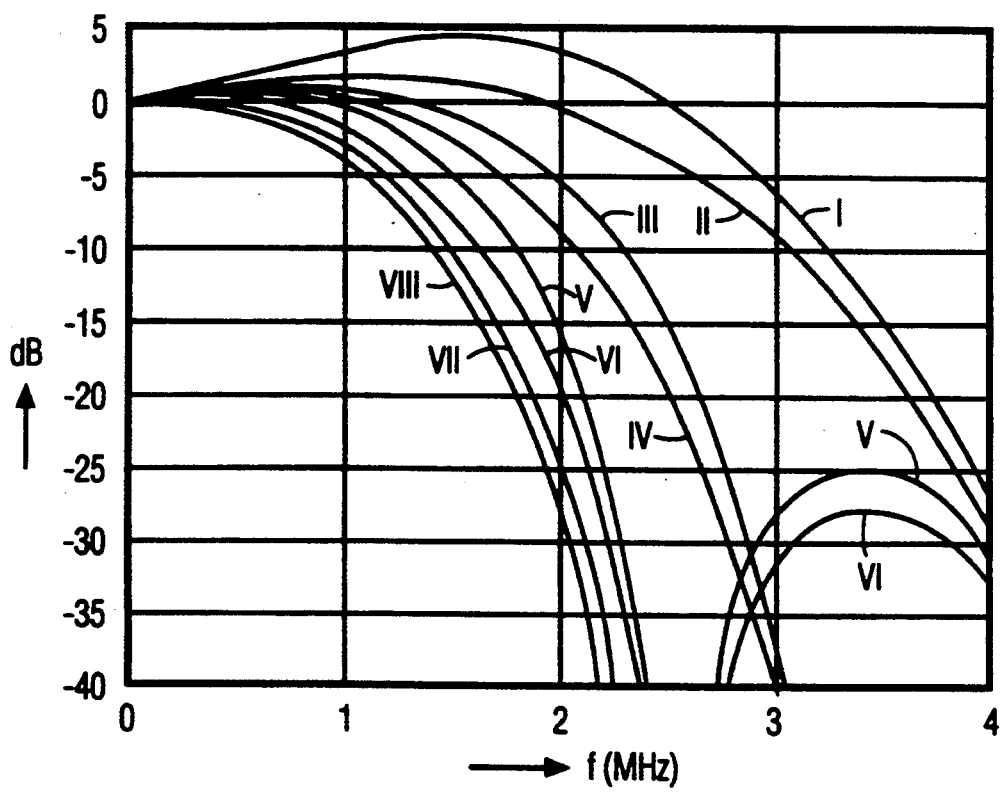
FIG. 3 shows the frequency response of a digital lowpass filter for the chrominance signal with various settings.
Figure 4:
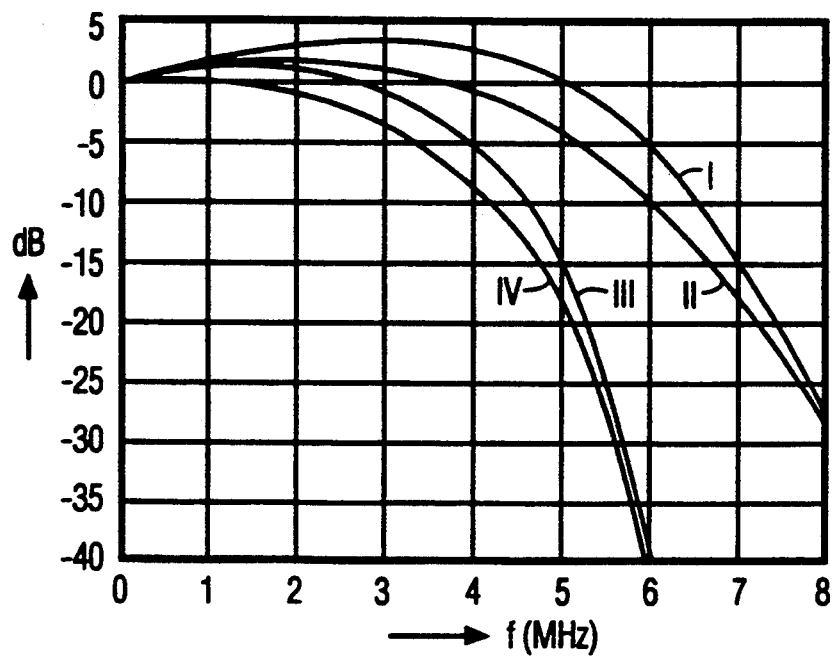
FIG. 4 shows the frequency response of a digital lowpass filter for the luminance signal with various settings.

The measuring circuit 9 measures the BER of the MAC video signal as the representative value for the signal quality and controls, via the IM bus 12, the transmission band of the digital filters 4 and 5 depending on the BER. When the BER is high, i.e. the signal quality is worsening, the transmission bandwidth of the filter is decreased. When the BER is low, i.e. good signal quality, the transmission bandwidth of the filter is increased. FIGS. 3 and 4 illustrate the changes to the transmission band of the digital filters depending on the BER of the received video signal.

The following Table shows the filter characteristics for filters 4 and 5

| BER | Luminance Filter (FIG. 4) | Chrominance Filter (FIG. 3) |
|---|---|---|
| <5 | I | IV |

-continued

| BER | Luminance Filter (FIG. 4) | Chrominance Filter (FIG. 3) |
| --- | --- | --- |
| 7 | II | VIII |
| 10 | II | VIII |
| 12 | IV | VIII |

The greater the BER the smaller transmission band of the digital lowpass filters. By limiting the transmission bands of the digital lowpass filters with a poor S/N ratio in a MAC video signal, some luminance and chrominance information is actually lost; however, the S/N ratio is increased which ultimately results in improved picture quality.

Figure 2:
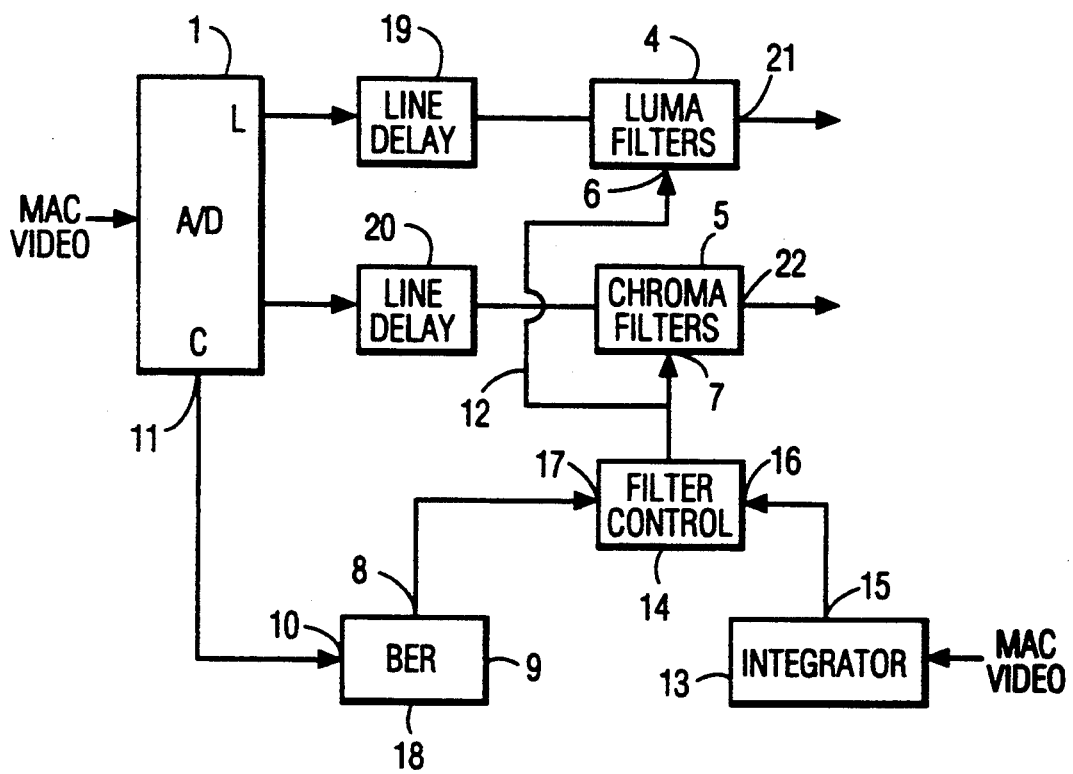
FIG. 2 is another preferred embodiment.

A further development of the block diagram shown in FIG. 1 is illustrated in FIG. 2. An integrator 13, or a picture brightness (luminance) measuring unit, calculates the brightness of areas of the picture, or of a complete picture from the MAC video signal and, via an output terminal 15, transmits a representative value for the brightness to an input terminal 16 of a filter control unit 14. The filter control unit (CCU) 14 has a further input terminal 17 which is connected to an output terminal 8 of the BER measuring unit 9. An output terminal of CCU 14 is connected to the control input terminals 6 and 7 of the digital lowpass filters 4 and 5 respectively by the IM bus 12. The filter control unit 14 controls the filters 4 and 5 whereby the transmission bands of the filters are narrowed only when the picture brightness integrator 13 measures dark areas of the picture and simultaneously the BER unit simultaneously outputs a high bit error rate. Because the "sparklies" more frequently appear as white points on a dark area of the picture, than as black points on a light area of the picture, such limiting of the transmission band of the filters is also advisable, particularly for dark areas of the picture and poor S/N ratios, because subjectively white points on a dark area are more disturbing than black points on a light area. Arranged between the analog-to-digital converter 1 and the digital lowpass filters 4 and 5 are the delay stages 19 and 20, respectively, which serve to improve the time coordination and synchronization of the selection of the luminance and chrominance signal components with the measuring of the BER and the picture brightness.

Additionally, a display unit can be provided (not illustrated) Which is connected with a further output terminal 18 of the bit error rate measuring circuit 9 to display the measured signal quality, for example, the number of BER per minute measured. Such an indicator unit can be, for example, a display unit like an LED or LCD independent of a television screen or a character generator of a teletext decoder which displays the measured values of the BER on the screen. However, other display forms can also be used.

I claim:

1. Apparatus for enhancing the quality of an image corresponding to a television signal including a digital component comprising:

means responsive to said digital component of said television signal for detecting the error rate of said digital component;

means responsive to said televisions signal for separating said television signal into luminance and chrominance components;

means including a first filter controllable in response to a first filter control signal for producing a filtered version of said luminance component;

means including a second filter controllable in response to a second filter control signal for producing a filtered version of said chrominance component; and means for generating said first and second filter control signals for said first and second filters, respectively, in response to said detected error rate of said digital component of said television signal.

2. The apparatus recited in claim 1, wherein at least one of said first and second filters has a controllable bandwidth controlled in response to the respective one of said first and second control signals.

3. The apparatus recited in claim 1, wherein said digital component component is included in the vertical retrace interval of said television signal.

4. The apparatus recited in claim 3, wherein said digital component is teletext data.

5. The apparatus recited in claim 3, wherein said digital component is programming data.

6. The apparatus recited in claim 1, wherein said digital component represents audio information.

7. The apparatus recited in claim 1, wherein said digital component is encoded in accordance with an error detection code.

8. The apparatus recited in claim 7, wherein said error detection code is a Hamming code.

9. The apparatus recited in claim 1, wherein at least one of said first and second filters has a controllable bandwidth, and the respective one of said first and second control signals controls said bandwidth of said one filter in inverse relationship to said error rate of said digital component.

10. Apparatus for enhancing the quality of an image corresponding to a television signal including a digital component comprising:

means responsive to said digital component of said television signal for detecting the error rate of said digital component;

means responsive to said television signal for detecting a signal representative of the darkness of said image;

means including a filter controllable in response to a control signal for producing a filtered version of said television signal; and means for generating said control signal for said filter in response to said detected error rate of said digital component of said television signal and said signal representative of the darkness of said image.

11. The apparatus recited in claim 10, wherein the bandwidth of said filter is controlled, and said control signal controls said bandwidth inverse relationship to said error rate and in inverse relationship with the darkness of said image.

* * * * *